United States Patent
Miś et al.

(10) Patent No.: US 12,086,660 B2
(45) Date of Patent: Sep. 10, 2024

(54) RADIO DEVICE WITH INTER-PROCESSOR COMMUNICATION CIRCUITRY

(71) Applicant: Nordic Semiconductor ASA, Trondheim (NO)

(72) Inventors: Hubert Miś, Cracow (PL); Nikita Fomin, Trondheim (NO); Hannu Talvitie, Oulu (FI); Joni Jäntti, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 245 days.

(21) Appl. No.: 17/721,093

(22) Filed: Apr. 14, 2022

(65) Prior Publication Data
US 2022/0334895 A1    Oct. 20, 2022

(30) Foreign Application Priority Data
Apr. 16, 2021  (GB) .................................. 2105454

(51) Int. Cl.
*G06F 9/54*  (2006.01)
*G06F 1/12*  (2006.01)

(52) U.S. Cl.
CPC ............... *G06F 9/542* (2013.01); *G06F 1/12* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | | |
|---|---|---|---|---|
| 8,774,718 | B2 * | 7/2014 | Paycher | H04W 72/1215 |
| | | | | 375/295 |
| 9,094,835 | B2 * | 7/2015 | Persson | H04W 16/14 |
| 9,277,564 | B2 * | 3/2016 | Wang | H04W 72/04 |
| 9,357,433 | B2 * | 5/2016 | Tarradell | H04W 74/085 |
| 9,602,266 | B2 * | 3/2017 | Song | H04J 11/0023 |
| 11,696,239 | B1 * | 7/2023 | Marupaduga | H04W 52/365 |
| | | | | 370/329 |
| 2010/0142487 | A1 | 6/2010 | Kim | |
| 2012/0182938 | A1 | 7/2012 | Mujtaba et al. | |

(Continued)

OTHER PUBLICATIONS

IPO Combined Search and Examination Report under Sections 17 and 18(3) for Great Britain Application No. 2105454.9, mailed Sep. 13, 2021, 7 pages.

*Primary Examiner* — Andy Ho
(74) *Attorney, Agent, or Firm* — Klarquist Sparkman, LLP (57) ABSTRACT

An integrated-circuit device comprising first and second radio systems. The first radio system comprises a first processor coupled to a first program memory and a first radio. The second radio system comprises a second processor coupled to a second program memory and a second radio. The device further comprises inter-processor communication (IPC) circuitry coupled to the first and second processors, for providing an IPC channel between the first and second processors. First software, stored in the first program memory for execution by the first processor comprises instructions for causing the first processor, in response to receiving a signal from the first radio, to send an electrical signal over the IPC channel to the second processor for causing second software stored in the second program memory to cause the second processor to send a command to the second radio.

20 Claims, 6 Drawing Sheets

(56) References Cited

U.S. PATENT DOCUMENTS

| | | | |
|---|---|---|---|
| 2013/0260687 A1 | 10/2013 | Paycher et al. | |
| 2014/0120969 A1* | 5/2014 | Sang .................. | H04B 1/406 |
| | | | 455/501 |
| 2021/0127405 A1* | 4/2021 | Ma ..................... | H04W 72/542 |
| 2021/0203447 A1* | 7/2021 | Tsai ................. | H04W 28/0268 |

* cited by examiner

RADIO DEVICE WITH INTER-PROCESSOR COMMUNICATION CIRCUITRY

BACKGROUND OF THE INVENTION

This application claims priority from Great Britain Application No. 2105454.9, filed on Apr. 16, 2021, which application is incorporated herein by reference in its entirety.

BACKGROUND OF THE INVENTION

This invention relates to an integrated-circuit device comprising two or more radio systems and inter-processor communication circuitry for signalling between the radio systems.

An integrated-circuit device may include an integrated digital radio, such as a Bluetooth or LTE-M radio, in addition to one or more processors, memory and other peripherals. Integrated devices that include two or more radios can face particular challenges from interference between the radios, due to the physical proximity of the radios and the sharing of some electrical circuitry. This may be mitigated by coordinating the radio transmission operations of the different radios, e.g. so that only one radio is actively transmitting at a time. However, such coordination is not always straightforward and may require precise timing.

In order to provide fast and predictable timing, it is known to communicate between multiple on-chip radio systems using hardware signalling lines that connect directly between the radios. These can support timely signalling by avoiding the unpredictable delays that can occur when sending messages over a shared bus system.

However, such a design is inflexible. The present invention seeks to provide a more versatile approach to signalling between radio systems on an integrated-circuit device.

SUMMARY OF THE INVENTION

From a first aspect, the invention provides a device comprising:
 a first radio system comprising: a first processor, a first program memory coupled to the first processor, and a first radio coupled to the first processor;
 a second radio system comprising: a second processor, a second program memory coupled to the second processor, and a second radio coupled to the second processor;
 inter-processor communication circuitry, coupled to the first and second processors, for providing an inter-processor communication channel between the first processor and the second processor; and
 first software stored in the first program memory for execution by the first processor;
wherein the device is an integrated-circuit device; and
wherein the first software comprises instructions for causing the first processor, in response to receiving a signal from the first radio, to send an electrical signal over the inter-processor communication channel to the second processor for causing second software stored in the second program memory to cause the second processor to send a command to the second radio.

Thus it will be seen that, in accordance with the invention, communication between the radios can take place over a communication channel between the respective processors of the two radio systems. This allows the meaning of a signal sent over the communication channel to be determined in software, rather than being fixed in hardware, and therefore enables the meaning to be set, and potentially changed, after the hardware has been manufactured. It can, for example, allow a firmware update or configuration change to provide new or different functionality in the signalling between the two radios.

The first software may be firmware provided by a manufacturer of the integrated-circuit device. In some embodiments, the second software may be provided by a different entity and/or loaded separately from the first software. The second software may not yet have been stored in the second memory in some embodiments. However, in other embodiments, the device additionally comprises second software stored in the second program memory. The second software may comprise instructions for causing the second processor to send a command to the second radio in response to the second processor receiving the electrical signal over the inter-processor communication (IPC) channel.

One or both of the first and second radio devices may be a cellular or long range radio. One or both of the first and second radio devices may implement a Long Term Evolution (LTE), e.g. Category-M1 (LTE-M), wireless communication protocol, or a Narrowband Internet-of-Things (NB-IoT) protocol, or both. One or both of the first and second radio devices may be a short range radio device, for example a Bluetooth, NFC or WiFi radio. In some embodiments, one of the first and second radio devices is a cellular or long range radio, and the other of the first and second radio devices is a short range radio.

In one set of embodiments, the first radio device is a cellular-network radio (e.g. implementing some or all of an LTE-M and/or NB-IoT standard), and the second radio device is a short-range radio (e.g. implementing some or all of a Bluetooth standard).

In some embodiments, the first software comprises instructions for controlling transmission and/or reception by the second radio in dependence on a transmission and/or reception state of the first radio. This can allow the integrated-circuit device to operate the radios in a time-multiplexed manner, such that signals are only transmitted (and/or received) at one of the first and second radios at one time. This may be particularly beneficial when the first and second radios use a common radio protocol, or operate in the same frequency band (e.g. the 2.4 GHz band), or when the first and second radios operate on different frequency bands but nonetheless benefit from operating in a time-multiplexed manner. The first software may therefore comprise instructions for causing the first processor to send an electrical signal over the inter-processor communication channel to the second processor, responsive to and/or representative of a transmission (or reception) state of the first radio. The signal may be for causing second software, stored in the second program memory, to cause the second processor to send a command to the second radio to control a transmission (or reception) of the second radio responsive to the transmission (or reception state) of the first radio. The command may be to allow or instruct transmission and/or reception by the second radio when the first radio is not transmitting and/or receiving. The command may additionally or alternatively be to prevent a transmission and/or reception by the second radio when the first radio is transmitting and/or receiving. In this way, simultaneous operation of the first and second radios may be prevented. The device may comprise second software, stored in the second program memory, comprising instructions for causing the second processor to send such a command to the second radio, responsive to receiving the electrical signal over the inter-processor communication channel.

The first and second processors may be in a common (e.g. a first) clock domain. The inter-processor communication circuitry may then also be in the common clock domain. The first radio may be in a different (e.g. second) clock domain from the first processor. The second radio may be in a different (e.g. the second or a third) clock domain from the second processor. When the first and second processors share a common clock domain, radio-radio signalling using the inter-processor communication channel can advantageously allow timing issues due to clock-domain crossings to be avoided, even if one or both of the radios is in a different clock domain. However, this is not essential and, in some embodiments, the first processor, the second processor, the inter-processor communication circuitry, the first radio, and the second radio, may all be in the same clock domain, while, in other embodiments, some or all of the first processor, the second processor, the inter-processor communication circuitry, the first radio, and the second radio, may be in different respective clock domains.

In some embodiments, the inter-processor communication circuitry comprises a first IPC peripheral connected to the first processor and/or a second IPC peripheral connected to the second processor. In such embodiments, an electrical signal sent over the IPC channel may be received (e.g. at a transistor) in the receiving IPC peripheral, which may be configured in response to send an electrical signal to the respective connected processor, for example by sending an interrupt request signal to a hardware interrupt input of the processor.

In some embodiments, the IPC channel comprises a set of one or more signal lines between the first and second processors. Some or all of the signal lines may be unidirectional, wherein the IPC circuitry is configured so that, for each unidirectional signal line, only a respective one of the first or second processors can send a signal to the other of the first or second processors. Some or all of the signals lines may be bidirectional, each line supporting signals in both directions between the first and second processors. In embodiments comprising a plurality of signal lines, both unidirectional and bidirectional signal lines may be present. Each signal line may be a single electrical conductor. An electrical signal sent over a signal line (e.g. the aforesaid electrical signal) may be a pulse or a logic transition (e.g. a rising or falling edge).

The device may comprise a system bus, to which one or both processors are communicatively coupled. A memory and/or one or more peripherals may also be communicatively coupled to the system bus. However, the inter-processor communication (IPC) channel is preferably separate from the system bus. Such an arrangement may allow timely signalling between the first and second processors over the IPC channel, avoiding the unpredictable delays that can occur when sending messages over a shared bus system.

The integrated circuit device may comprise a shared memory, accessible by both the first and second processors, e.g. over a shared bus system. The shared memory may comprise volatile and/or non-volatile memory. The shared memory may store data readable by one or both of the first and second processors. The shared memory may store software instructions executable by one or both of the first and second processors. The first and second program memories may be different memories. The first and second program memories may be inaccessible to the second and first processors respectively. However, in some embodiments, the first and second program memories may be the same memory, or may be respective regions of a common memory, which may be a shared memory.

In some embodiments, the first electrical signal sent over the IPC channel may cause the second processor to read data and/or execute one or more software instructions stored in a shared memory of the integrated circuit device.

The second software may directly instruct the second processor to send the command to the second radio, or the second software may cause the command to be sent by invoking (e.g. branching execution to) further software (e.g. a set of one or more instructions), which may be stored on a memory outside the second radio system, such as on a shared memory.

In some embodiments, the second processor may be configured for sending electrical signals over the IPC channel to the first processor. The second software may comprise instructions for causing the second processor, in response to receiving a signal from the second radio, to send an electrical signal over the inter-processor communication channel to the first processor. In addition or alternatively, the second software may comprise instructions for causing the second processor to send an electrical signal over the inter-processor communication channel to the first processor for any other reason (e.g. not necessarily related to an action of the second radio). The first software (or additional software stored in the first program memory) may comprise instructions for causing the first processor, in response to the electrical signal, to send a command to the first radio. The first (or additional) software may directly instruct the first processor to send this command to the first radio, or it may cause the command to be sent by invoking further software, which may be stored on a memory outside the first radio system, such as on a shared memory.

In some embodiments, the device may additionally be configured to enable an electrical signal received over the inter-processor communication channel to provide a command to the first radio directly, without involving the first processor. It may be configured to enable an electrical signal received over the IPC channel to provide a command to the second radio directly, without involving the second processor. Having the option to bypass a processor in this way may allow a signal to be received by the respective radio more quickly, which may be desirable in cases where signalling flexibility is less important than the speed at which the signal is received by the radio.

In embodiments in which the IPC channel comprises a plurality of signal lines, the first software may comprise instructions for causing the first processor to send electrical signals over different respective signal lines in response to receiving signals of different respective types from the first radio. Similarly, in some embodiments, the second software may comprise instructions for causing the second processor to send electrical signals over different respective signal lines in response to receiving signals of different respective types from the second radio.

The first radio may be configured to signal two or more different types of signal to the first processor. The second radio may be configured to signal two or more different types of signal to the second processor. The types of signal may include one or more request signal types and one or more authorisation signal types. A signal of a request type may be one or more of: a signal to request permission to transmit and receive; a signal to request permission to transmit; and a signal to request permission to receive. A signal of an authorisation type may be one or more of: a signal to allow transmission and reception by the other radio; a signal to allow transmission by the other radio; a signal to allow reception by the other radio; a signal to deny transmission and reception by the other radio; a signal to deny transmission by the other radio; and a signal to deny reception by the other radio.

In embodiments in which the IPC channel comprises a plurality of signal lines, signals received by the second processor over the IPC channel may cause the second processor to take different actions depending on the identity of the signal line over which the electrical signal is received. They may cause the second processor to send commands of different respective types to the second radio. Similarly, signals received by the first processor over the IPC channel may cause the first processor to take different actions depending on the identity of the signal line over which the electrical signal is received. They may cause the first processor to send commands of different respective types to the first radio. Types of command may include one or more of: a status query command type; request command types; and authorisation command types. In some embodiments, each signal type output by a radio may correspond to a respective command type to the other radio. The signals may, in some embodiments, be passed between the radios without processing by the first and second processors—e.g. with a "request permission to receive" signal from the second radio being passed as a "request permission to receive" command to the first radio, and with a resulting "allow" or "deny" signal from the first radio being passed to the second radio, via the IPC channel. In other embodiments, the first or second software may process the signals and/or commands—e.g. with a "request permission to receive" signal from the second radio being passed as a "status query" command to the first radio, wherein the first software interprets a response to the status query and sends an appropriate an allow or deny signal to the second radio.

For example, if an electrical signal is received by the second processor over a first signal line, the second software may instruct the second processor to command the second radio to transmit a radio signal, while if an electrical signal is received over a second signal line, the second software may instruct the second processor to command the second radio not to transmit a signal (e.g. to delay or cease a transmission). Signals received over different signal lines (e.g. any of first, second, third, fourth, fifth or more signal lines) may cause the second processor to perform different actions (e.g. any of first, second, third, fourth, fifth, or more actions respectively). They may cause the processor to execute from a different respective address in the second program memory, or to store a different respective value in a register readable by the second software, in response to receiving a signal over each respective signal line. Any of these features may apply similarly to the first processor and to the first software in some embodiments.

For one or both processors, the receipt of a signal over the IPC channel may cause software executing on the receiving processor to perform one or more actions directly, or, in embodiments comprising a shared memory, to read or fetch from an address in a shared memory. Reading data or executing further software from the shared memory may cause the receiving processor to send a command to the respective radio coupled to the processor. In embodiments in which the IPC channel comprises a plurality of signal lines (which may be all, or a subset of, the signal lines present in the IPC channel), each signal line may cause the receiving processor to read or fetch from a different respective address in the shared memory. The address in the shared memory may store data, or may be able to store data, comprising a value that the processor uses to determine what action to perform (e.g. by inputting it as a parameter to a switch statement). Alternatively, the address in the shared memory may store a set of software instructions that can be executed by the processor.

In some embodiments, for one or both processors, the actions taken by the processor in response to receiving a signal over the IPC channel may be modified in accordance with a software or hardware setting on the device. In some embodiments, the first software may comprises instructions for causing the first radio system to operate in a first state at a first time, and to operate in a second state at second time, wherein, when in the first state, the first software causes the first processor, in response to receiving a signal of a first type from the first radio, to send an electrical signal over a signal line of the inter-processor communication channel to the second processor for causing second software stored in the second program memory to cause the second processor to send a command to the second radio, and, when in the second state, the first software causes the first processor, in response to receiving a signal of a second type, different from the first type, from the first radio, to send an electrical signal over said signal line (i.e. the same line) of the inter-processor communication channel to the second processor. The second software may cause the second processor to send the same command to the second radio in both states of the first radio system. However, in some embodiments the second software may comprises instructions for causing the second radio system to operate in a first state at the first time, and to operate in a second state at the second time. It may cause the second processor to send a command of a first command type to the second radio, in response to the second processor receiving an electrical signal over said signal line when in the first state, and to send a command of a second command type, different from the first command type, to the second radio, in response to the second processor receiving an electrical signal over said signal line when in the second state. In this way, the meaning of signals sent over a particular signal line may be changed for one or both the first and second radio systems, by changing states. The first and/or second software may comprise instructions for changing state based on data stored on the device—e.g. in a register or other memory. The change may be user configurable—e.g. by changing a parameter in memory. The change may be determined by the device based on one or more conditions, such as received signal strength at the first and/or second radios, or a location of the device In some embodiments, for one or both processors, the actions taken by the processor in response to receiving a signal over the IPC channel may be modified by providing a firmware update to the device. The software stored in the program memory of the first and/or second processor may be updated, such that when executed by the processor, a different action is performed in response to receiving a signal over a particular signal line of the IPC channel after the update. For example, in embodiments in which the IPC channel comprises a plurality of signal lines, following such an update, a different set of actions may be performed by the processor in response to receiving a respective signal over each respective signal line. In embodiments comprising a shared memory, the data stored in one or more addresses read by the first and/or processor in response to receiving a signal over the IPC channel may be updated, such that when read by the first and/or second processor, the processor performs a different action.

Thus, from a further aspect, the invention provides a method of updating an integrated-circuit device, wherein the integrated-circuit device comprises:

a first radio system comprising: a first processor, a first program memory coupled to the first processor, and a first radio coupled to the first processor;

a second radio system comprising: a second processor, a second program memory coupled to the second processor, and a second radio coupled to the second processor;

inter-processor communication circuitry, coupled to the first and second radio processors, for providing a communication channel between the first processor and the second processor; and first software stored in the first program memory for execution by the first processor;

wherein the first software comprises instructions for causing the first processor, in response to receiving a signal of a first type from the first radio, to send an electrical signal over a signal line of the inter-processor communication channel to the second processor for causing second software stored in the second program memory to cause the second processor to send a command to the second radio;

the method comprising:

the device receiving updated first software; and storing the updated first software in the first program memory, wherein the updated first software comprises instructions for causing the first processor, in response to receiving a signal of a second type, different from the first type, from the first radio, to send an electrical signal over said signal line of the inter-processor communication channel to the second processor.

The first software may, therefore, send a signal (e.g. a pulse or logic transition) over the same signal line in response to different types of signal from the first radio, before and after the software update.

The device may comprise second software stored in the second program memory. The method may further comprise the device receiving updated second software, and storing the updated second software in the second program memory. The (original) second software may comprise instructions for causing the second processor to send a command of a first command type to the second radio, in response to the second processor receiving an electrical signal over said signal line, and the updated second software may comprise instructions for causing the second processor to send a command of a second command type, different from the first command type, to the second radio, in response to the second processor receiving an electrical signal over said signal line. In this way, the meaning of signals sent over a particular signal line may be changed on both the first and second radio systems.

In some embodiments comprising a shared memory, the IPC channel comprises a single signal line between the two processors. In such embodiments, the first and second software may comprise instructions to read and write data to a common address or set of addresses in the shared memory. When communication between the two processors is required, the first processor may write to the preset address(es) in the shared memory, and subsequently send an electrical signal to the second processor over the signal line. In response to receiving the electrical signal over the signal line, the second processor may read the data stored at the preset address(es) in the shared memory, and determine what action to perform based on this data.

Signalling between the first and second processors may allow co-existence control of the first and second radios, such that the two radios do not perform transmit operations simultaneously. In some embodiments, the second software may cause the second processor to command the second radio to transmit a radio signal in response to receiving a signal from the first processor, via the IPC channel, indicating that the first radio is not actively transmitting or, in some embodiments, indicating that the first radio is not actively transmitting or receiving.

The first and second radio systems may be configured to coordinate radio activity according to a master/slave relationship. In some embodiments the second radio may be the master radio, and the first radio may be the slave radio. In some such embodiments, transmission from the first radio is only permitted when the second radio is not transmitting. The state of second radio thus dictates which actions can be performed by the first radio. In some such embodiments, the first radio may signal the second radio via the first and second processors and the IPC channel, to determine whether transmission from the first radio is permitted. For example, the first radio may send a signal to the first processor indicating a request for transmission. The first processor may execute software to send an electrical signal over the IPC channel to the second processor, causing the second processor to send a command to the second radio requesting a status of the second radio. The second radio may respond with an indication that the second radio is active or that it is inactive (which may be in respect just of transmission, or just of reception, or of both). The second processor may execute software to send an electrical signal over the IPC channel to the first processor to respond to the request for transmission. Based on the response, the first processor may command the first radio to transmit, depending on the communicated status of the second radio.

In some embodiments, the first radio may send a priority request for transmission via the first processor. This may allow a slave radio to override a master-slave relationship in urgent cases. In response to such a request, a transmission of the second radio may be interrupted to allow the first radio to transmit, or both the first and second radios may be allowed to transmit simultaneously.

The master/slave status of the first and second radios may be set based on different respective timing requirements. The radio with the stricter timing requirements may be designated as the master radio. In embodiments in which one of the first and second radios is a cellular radio, and the other of the first and second radios is a short range radio, the cellular radio may be set as the master radio. This may enable the strict timing requirements on transmission and/or reception of radio signals in the cellular radio to be adhered to.

In some embodiments, the integrated-circuit device may comprise one or more further radio systems, such as third and/or fourth and/or fifth radio systems, which may be coupled to the first and/or second radio systems by inter-processor communication circuitry. Each further radio system may comprise a respective processor, a respective program memory coupled to the processor, and a respective radio coupled to the processor. In some such embodiments, a further radio system may be configured to coordinate radio activity according to a master/slave relationship with one or both of the first and second radio systems, e.g. as described above. In some embodiments the second radio may be a master radio, and the first and further radios (e.g. third and/or fourth and/or fifth radios) may be slave radios. In some such embodiments, transmission by the first and any further radios is only permitted when the second radio is not transmitting. The state of second radio may thus determine whether one or more actions can be performed by the first and further radios. In some such embodiments, one of the first and further radios may signal the second radio via its respective processor, the second processor and the IPC channel, to determine whether transmission from the one of the first and further radios is permitted, e.g. in a manner equivalent to that described above.

The integrated-circuit device may be integrated on one or more semiconductor substrates; it may be or comprise a silicon chip. It may be a system-on-chip. It may comprise one or more interfaces for receiving electrical power (e.g. from a battery) and/or a clock signal (e.g. from an off-chip quartz crystal) and/or for connection to other discrete or integrated-circuit components. It may form part of an electrical device, such as a wireless sensor, a domestic appliance, a wireless loudspeaker, a mobile telephone, a vehicle, or any other radio-enabled device.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
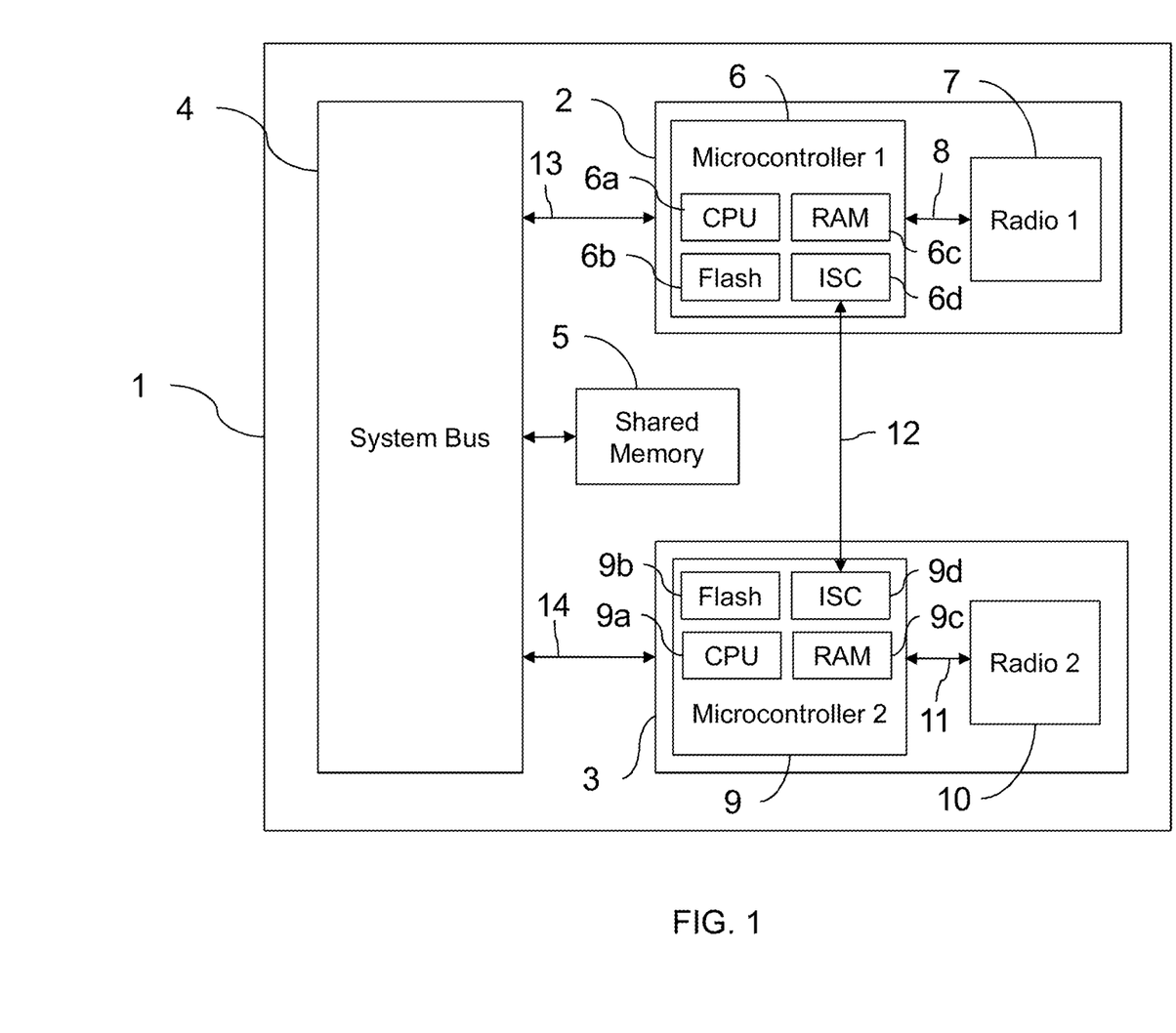
FIG. 1 is a schematic diagram of a system-on-chip device embodying the invention.

FIG. 1 is a schematic diagram of a device 1 in accordance with exemplary embodiments of the present invention. The device 1 is an integrated-circuit system-on-chip. It comprises a first radio subsystem 2, a second radio subsystem 3, a system bus 4, and a shared memory unit 5. The system bus 4 is coupled to the shared memory unit 5, and is connected to the first and second radio subsystems 2 and 3 by communication lines 13 and 14 respectively. The device 1 may, of course, include other conventional components, such as further processors, memory, peripherals, clock circuitry, power-control circuitry, etc. In use, the device 1 may be coupled to one- or more off-chip components, such as a power supply, quartz crystals, discrete electrical components, radio antennas, etc.

The first radio subsystem 2 comprises a first microcontroller 6 and a first radio 7. The first microcontroller 6 and the first radio 7 are in signal communication via a first set of one or more radio-peripheral communication lines 8, which enables the first radio 7 to issue interrupt request (IRQ) and event signals to the first microcontroller 6 via the first radio-peripheral communication lines 8. The first microcontroller 6 is configured to be able to issue instructions to first radio 7 over the first radio-peripheral communication lines 8. The first radio 7 may be a short range radio, for example a Bluetooth or NFC radio.

The second radio subsystem 3 comprises a second microcontroller 9 and a second radio 10. Similarly to the first radio subsystem 2, the second microcontroller 9 and the second radio 10 are in signal communication via a second set of one or more radio-peripheral communication lines 11, which enable the second radio 10 to issue IRQ and event signals to the second microcontroller 9 via the second radio-peripheral communication lines 11. The second microcontroller 9 is configured to be able to issue instructions to the second radio 10 via the second radio-peripheral communication lines 11. The second radio 10 may be a long range radio, for example an LTE-M or NB-IoT radio.

The first microcontroller 6 comprises a first processor 6a, a first local non-volatile memory (e.g. flash) 6b for storing software for execution by the first processor 6a, and a first local volatile memory (e.g. RAM) 6c for use by the processor 6a when executing the software. It also comprises an inter-processor communication (abbreviated herein as "IPC") peripheral 6d, coupled to the processor 6a by a local bus (e.g. an Advanced Peripheral Bus, APB). It may comprise any number of further peripherals, buses and components.

The second microcontroller 9 similarly comprises a second processor 9a, a local non-volatile memory 9b, volatile memory 9c, IPC peripheral 9d, and optional further peripherals. The IPC peripherals 6d, 9d act to provide an inter-processor communication (IPC) channel as described in the following.

In some variant embodiments, the software for one or both of the processors 6a, 9a may instead be stored on a shared system-level memory, rather than in local memories 6b, 9b.

The IPC peripherals 6d, 9d in the first and second microcontrollers 6, 9 of the radio subsystems 2, 3 are connected by an inter-subsystem communication (ISC) link 12, comprising a set of one or more unidirectional or bidirectional signal lines, such that the first microcontroller 6 can issue signals to the second microcontroller 9 via the ISC link 12 and vice versa. Each signal may be a pulse, or a rising or falling voltage edge, and may be clocked or asynchronous. The first and second IPC peripherals 6d, 9d and the ISC link 12 together provide inter-processor communication circuitry as disclosed herein.

The IPC peripherals 6d, 9d and ISC link 12 are configured to allow the first microcontroller 6 to interrupt the processor of the second microcontroller 9 by sending an interrupt request signal over the link 12. Although such a signal will be referred to herein for convenience as an IRQ signal, it should be understood that a line of the link 12 need not necessarily connect directly to the core of the second processor 9a, but may terminate in the IPC peripheral 9d of the second microcontroller 9, which may in turn be configured to respond to an incoming signal on the line by sending an IRQ signal to a hardware interrupt input of the second processor 9a. In addition or alternatively, at least one line of the link 12 may be coupled to the second radio 10 directly, bypassing the second processor 9a, such that some signals sent over the link 12 cause an immediate action at the second radio 10.

The device 1 may similarly be configured to allow the second microcontroller 9 to interrupt the processor 6a of the first microcontroller 6 by sending an interrupt request signal over the link 12. In addition or alternatively, the device 1 may similarly be configured such that at least one line of the link 12 is coupled to the first radio 7 directly, bypassing the first processor 6a, such that some signals sent over the link 12 can cause an immediate action at the first radio 7.

In other embodiments, the functionality of the IPC peripherals 6d, 9d may be implemented directly within the respective processor cores 6a, 9a, rather than as peripherals accessed over respective local buses.

The first and second microcontrollers 6, 9 can both read and write to a common set of addresses in the shared memory unit 5 via the respective communication lines 13, 14 and the system bus 4. In addition or alternatively, the first and/or second local volatile memory 6c, 9c of the first and second microcontrollers 6, 9 respectively can act as a shared memory. This may be preferred over a shared memory accessible via the system bus when one or both of the microcontrollers 6, 9 requires short or predictable latency when writing/reading shared data.

As both the first and second microcontrollers 6, 9 have access to the shared memory unit 5, communication between the first and second microcontrollers 6, 9 can take place by one-way or two-way exchange of data stored in the shared memory unit 5. As the first and second radios 7, 10 are connected to the first and second microcontrollers 6, 9 respectively, information about the state of the first and second radios 7, 10 can therefore be communicated between the first and second radio subsystems 2, 3 of the device 1 using the ISC link 12 and the shared memory unit 5, as described below. There are various ways in which information may be communicated between the first and second microcontrollers 6, 9 over the communication link 12. In some embodiments, information is communicated using the shared memory 5 in combination with the ISC link 12, while in other embodiments, information can be communicated using only the ISC link 12.

Thus, in a first set of embodiments, firmware executing on the microcontrollers 6, 9 associates signals sent over the ISC link 12 with one or more predetermined addresses in the shared memory unit 5. When an IRQ signal is received by one of the first and second microcontrollers 6, 9 over the ISC link 12, software executing on the receiving microcontroller causes the receiving microcontroller to read data from one or more predetermined addresses in the shared memory unit 5.

For example, in the event that the first microcontroller 6 has a message to transmit to the second microcontroller 9, the first microcontroller 6 sends an interrupt request to the second microcontroller 9 over the ISC link 12. In response to receiving the IRQ signal, the second microcontroller 9 reads data from a predetermined address in the shared memory unit 5.

It will be appreciated that the ISC link 12 may have just a single line (e.g. for sending a binary signal from the first ISC 6d to the second ISC 9d), or a plurality of ISC lines, each associated with a different respective address in the shared memory unit 5. In this way, a plurality of message types can be sent between the microcontrollers 6, 9 by using specific ISC lines associated with messages stored at one or more predetermined addresses in the shared memory unit 5.

Figure 2:
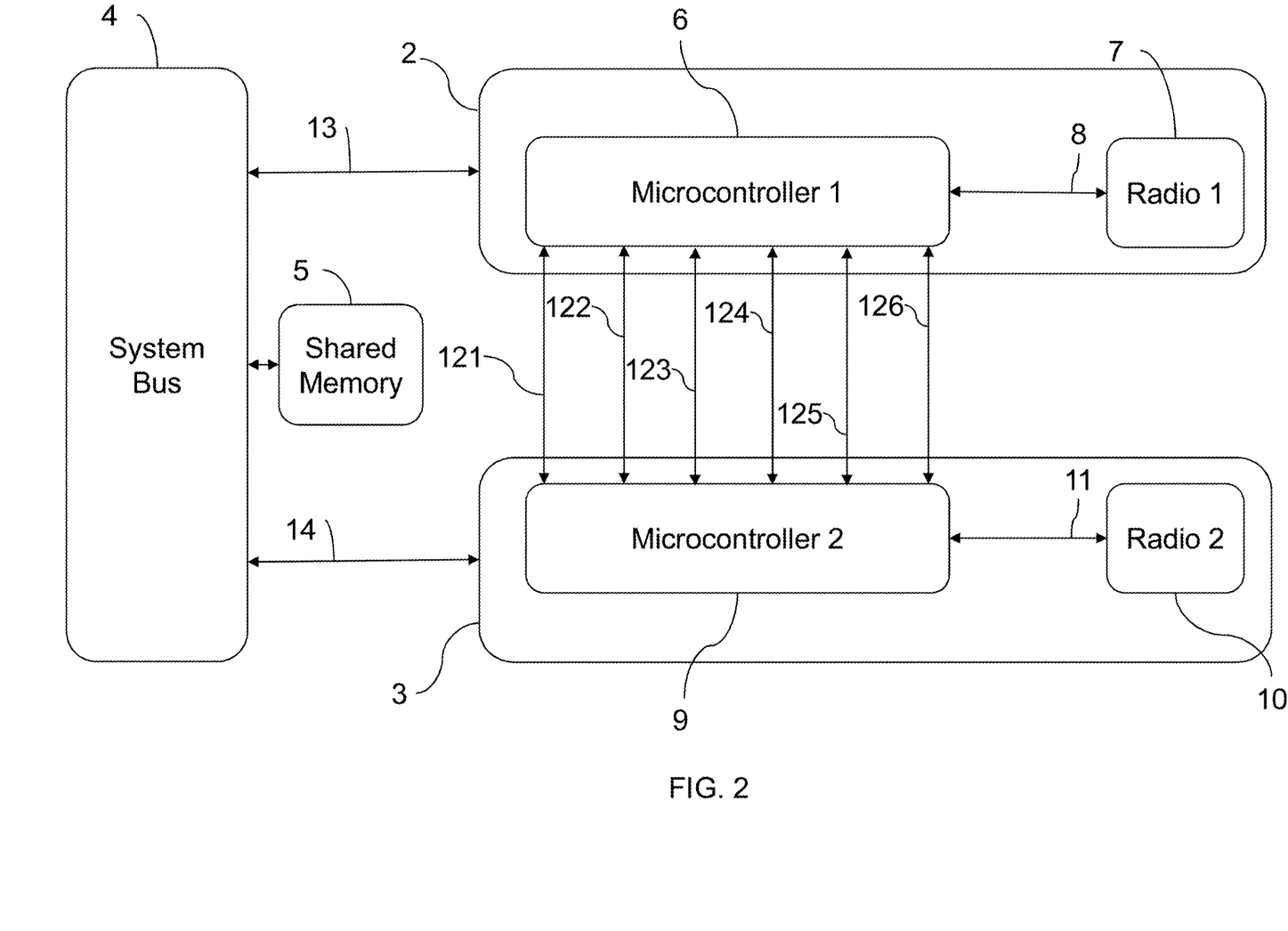
FIG. 2 is a schematic diagram showing more details of an inter-subsystem communication link in some embodiments of the device.

By contrast, in a second set of embodiments, instructions can be communicated without using the shared memory 5. This is illustrated in FIG. 2, in which the ISC link 12 comprises six bidirectional inter-subsystem communication (ISC) lines 121-126 (or, alternatively, six pairs of unidirectional ISC lines for signalling in opposite directions). At least some of the six ISC lines 121-126 have respective associated meanings such that when an IRQ is received at one of the microcontrollers 6, 9 over one of the six ISC lines 121-126, a predetermined operation is carried out by the microcontroller receiving the IRQ. These meanings are represented by software instructions or parameters stored in the program memories 6b, 9b of the microcontrollers 6, 9, rather than by data written to the shared memory 5. (However, in some embodiments, a combination of both approaches may be used.)

In one example configuration, when the second microcontroller 9 receives an IRQ signal over a first ISC line 121, firmware executing on the second microcontroller 9 sends a command to the second radio 10, over the second radio-peripheral communication lines 11 to request the operating status of the radio. The operating status of the second radio 10 may then be returned to the second microcontroller 9 over the second radio-peripheral communication lines 11, which the firmware then communicates back to the first microcontroller 6 using another of the plurality of ISC lines, with the choice of ISC line conveying the operating status. For example, if the second radio 10 is active, an IRQ signal is sent to the first microcontroller 6 over the second ISO line 122, and if the second radio 10 is inactive, an IRQ is instead sent to the first microcontroller 6 over the third ISO line 123.

It will be appreciated that, in other embodiments, more or fewer physical ISO lines may be present than are shown in FIG. 2.

In any of the embodiments, whether the shared memory 5 is used or not, signals sent by one of the first and second microcontrollers 6, 9 over the ISO link 12 may provide instructions to the other one of the first and second microcontrollers 6, 9 for controlling the first or second radios 7, 10 respectively. This provides a means for co-existence control of the first and second radios 7, 10, such that the firmware can, in some embodiments, ensure only one of the radios 7, 10 carries out transmit or receive operations at a time. This can reduce potential interference between the first and second radios 7, 10.

For example, the first microcontroller 6 may transmit a signal to the second microcontroller 9 over the ISO link 12 to request the status of the second radio 10, i.e. to ascertain whether the second radio 10 is currently transmitting a signal. The first microcontroller 6 may instruct the first radio 1 to transmit a radio signal if the second microcontroller 9 responds by transmitting a signal to the first microcontroller 6 indicating that the second radio is inactive, and not if the second radio 10 is actively transmitting.

The first and second radio subsystems 2, 3 may have a master/slave relationship, based on the operation of their respective radio systems, which have different timing requirements. When the second radio 10 is an LTE radio, very strict timing requirements on transmission reception of radio signals are in place. When the first radio 7 is a Bluetooth or NFC radio, the timing requirements of the first radio 7 are not as strict, and hence co-existence operation of the device 1 is controlled based on the requirements of the second radio 10. As such, the second radio sub-system 3 acts as the master, and the first radio sub-system 2 acts as the slave.

Of course, other regimes of operation are also possible, in which the first and second radio subsystems 2, 3 have equal status. In some embodiments, the first and second radio subsystems 2, 3 could use a 'round-robin' mode of operation, in which one of the first and second radio subsystems 2, 3 is active while the other waits, after which the states of the first and second radio subsystems 2, 3 are switched.

Figure 3:
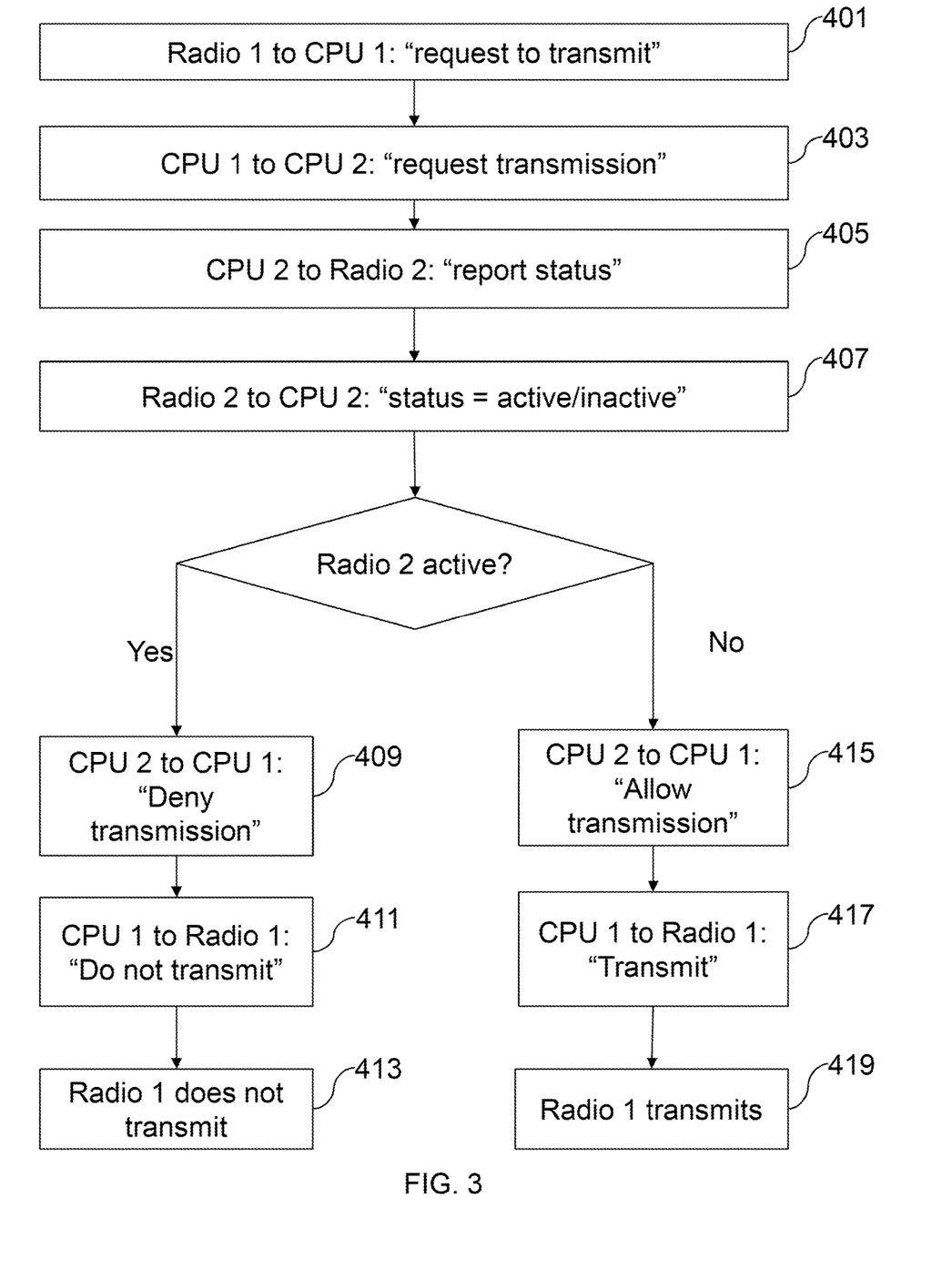
FIG. 3 is a flow chart of an example radio transmission operation using the device.

An example of co-existence communication between the first and second subsystems 2, 3 is provided in FIG. 3, which shows a flow chart of an LTE-M radio transmission operation using the first radio 7 of the device 1.

In step 401, the first radio 7 sends an IRQ signal to the first microcontroller 6 over the first radio-peripheral communication line 8 indicating a request to transmit a first radio signal. In response, in step 403, the first microcontroller 6 sends an IRQ signal to the second microcontroller 9 over the ISO link 12, to determine the status of the second radio 10 (i.e. to determine whether the second radio 10 is itself in the process of performing a transmit or receive operation). The second microcontroller 9 then communicates, in step 405, with the second radio 10 over the second radio-peripheral communication lines 11 to determine whether the second radio 10 is active. The second radio 10 responds, in step 407, with information regarding its current state.

If the second radio 10 is active (i.e. transmitting, or, in some embodiments, transmitting or receiving), the process continues to step 409, and the second microcontroller 9 sends an IRQ to the first microcontroller over the ISO link 12 indicating that the request for transmission is denied. In step 411, the first microcontroller 6 sends an IRQ to the first radio 7 indicating that no transmission should take place (in order to avoid the risk of interfering with the radio transmission from the second radio 10), and no transmission operation by the first radio 7 is performed in step 413.

If, however, the second radio 10 is inactive, the process continues to step 415, and the second microcontroller 9 sends an IRQ to the first microcontroller over the ISO link 12 indicating that the request for transmission is accepted. In step 417, the first microcontroller 6 sends an IRQ to the first radio 7 indicating that transmission can take place, and the transmission operation is performed in step 419.

The device 1 can also, advantageously, be reconfigured to implement different behaviours. In particular, the role of the ISO link 12 can be updated. The meaning of signals sent over the ISO link 12 is therefore configurable, and can be changed, for example by updating the firmware executing on the first and/or second microcontrollers 6, 9, or in response to a parameter change, or other state change, on the device 1.

For example, the meaning of signals sent over the ISO link 12 may, in some embodiments, be varied (without requiring a firmware update) based on the strength of signals received at the first and/or second radios 7, 10. Alternatively or additionally, the meaning of signals sent over the ISO link 12 may, in some embodiments, be controlled based on the location of the device 1, e.g. to comply with telecommunication regulations in a region in which the device 1 is located. Alternatively or additionally, the meaning of signals sent over the ISO link 12 may, in some embodiments, be configurable based on a preference of an operator of device 1—for example, in some circumstances, concurrent radio operation may be preferred, despite reduced receiver sensitivity, and a parameter may be stored in memory to configure the meaning of signals sent over the ISO link 12 accordingly to allow this.

The meaning of signals sent over the ISO link 12 may, in some embodiments, be configured based on feedback from a network over which the radio devices are transmitting and/or receiving signals. For example, the device 1 may initially allow signals to be received and/or transmitted from both radios simultaneously. However at a later point in time feedback may be received from the network, e.g. indicating that data packets are being missed. The meaning of signals sent over the ISO link 12 may then be changed by a setting accessed by both the first and second software to adapt the signal transmission/reception regime to reduce packet loss.

As actions taken by the first and second microcontrollers 6, 9 in response to an IRQ sent over the ISO link 12 can be updated over time, the useful life of the device 1 can be extended, as the meaning of IRQs sent over the ISO link 12 can be modified, e.g. signal transmission and reception regimes are changed. Also, the same hardware design may be adapted to multiple different contexts, leading to manufacturing efficiency.

The way in which the meaning of the interrupts is updated depends on the architecture of the device 1.

In embodiments in which the ISO link 12 comprises a plurality of ISO lines, in which signals sent over each of the ISO lines each have an associated meaning, (e.g. represented by data stored in a memory 6b, 6c, 9b, 9c of the microcontrollers 6, 9), the meaning of such signals can be updated, e.g. by an action or updating of the firmware of the first and/or second microcontrollers 6, 9. This may allow the meaning of the signals sent over each of the ISO lines to be changed, or may allow new meanings to be assigned to previously unused communication lines. This is explained in the following with reference to FIG. 4 and FIG. 5.

Figure 4:
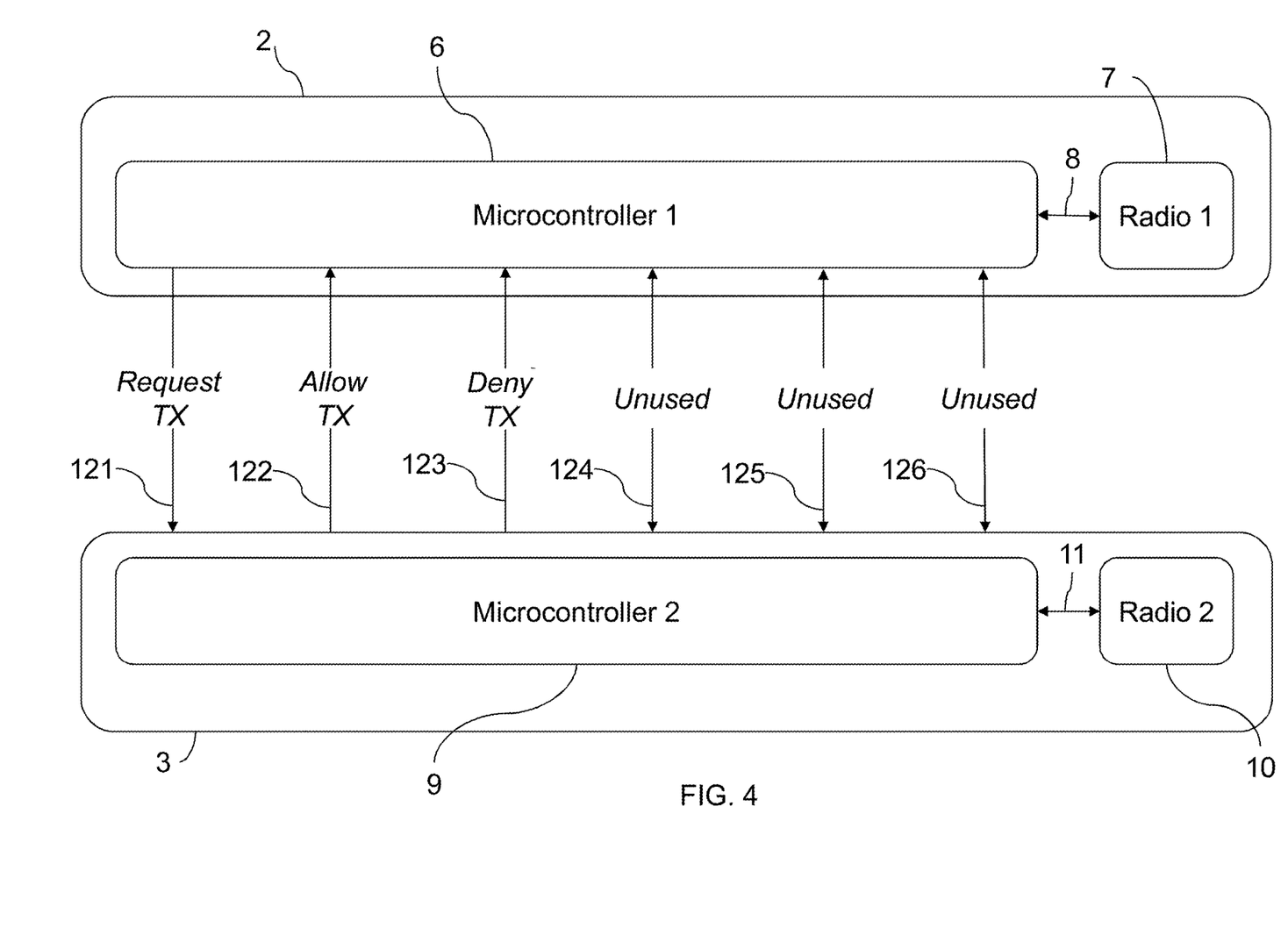
FIG. 4 is a schematic diagram showing an example use of the inter-subsystem communication link.

FIG. 4 shows the first and second radio subsystems 2, 3 of the device 1 at a first time $t_1$. As can be seen in FIG. 4, the first and second microcontrollers 6, 9 are connected by six ISO lines 121-126. The current meaning of a signal sent in an indicated direction over each of the ISO lines 121-126 is shown in the text overlays. As shown in FIG. 4, at time $t_1$, only three of the ISO lines 121-123 have a defined meaning, while the remaining ISO lines 121-123 are unused.

At time $t_1$, the ISO lines 121-123 are sufficient for co-existence control of the first and second radios 7, 10, to ensure that only one of the radios 7, 10 carries out transmit or receive operations at a time. As described in relation to FIG. 3, the first microcontroller 6 is able to request the status of the second radio 10 (to determine whether transmission by the first radio 7 can take place) using the first ISO line 121. The second microcontroller 9 is able to respond over either the second ISO line 122 (if the second radio 7 is inactive) or over the third ISO line 123 (if the second radio 7 is active), and the first microcontroller 6 can indicate to the first radio 7 if transmission can take place.

Suppose, at a later time, $t_2$, it becomes useful for the device 1 to also be able to handle priority transmission requests. For example, there may be instances in which transmissions from the first radio 7 are required immediately, while transmission from the second radio 10 may be delayed. In such circumstances, it is helpful to apply different criteria to determine whether the first radio 7 should be allowed to transmit, e.g. by interrupting transmissions by the second radio 10, or accepting a risk of interference by allowing both to transmit simultaneously, in priority situations.

Figure 5:
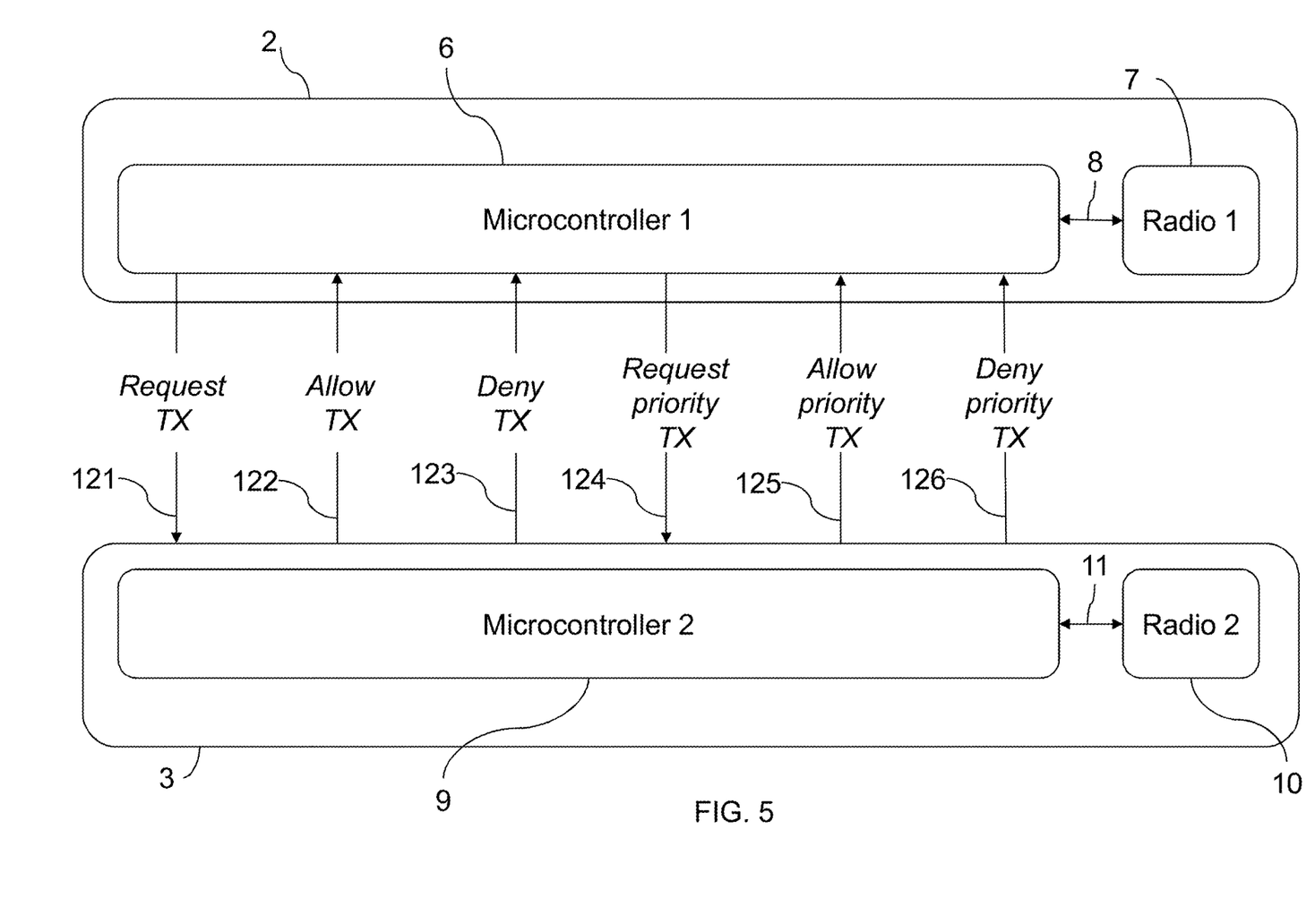
FIG. 5 is a schematic diagram showing an example use of the inter-subsystem communication link.

To facilitate such a new mode of operation, a firmware update may be provided to the device 1 (e.g. by an over-the-air update), updating the software executed by both the first and second microcontrollers 6, 9. In the new firmware, the meaning of signals sent over the ISO lines 121-126 is changed. In particular, previously unused ISO lines 124-126 are updated to allow the device 1 to handle priority transmission requests, as shown in FIG. 5. As can be seen in FIG. 5, following the firmware update, ISO lines 124-126 are assigned for the use of priority transmission requests, to function in a manner equivalent to ISO lines 121-123. In FIG. 5, a fourth ISO line 124 is assigned for requesting priority transmission, while fifth and sixth ISO lines 125 and 126 are assigned for allowing or denying such transmission respectively. When a signal is received over the fourth ISO line 124 indicating a priority transmission request, different criteria are assessed to determine whether transmission by the first radio 7 is allowed.

In this way, following the firmware update, different determinations may be made by the second microcontroller 9 about when to allow transmission by the first radio 7 depending on whether the request is a priority request (i.e. received over ISO line 124) or a standard request (i.e. received over ISO line 121).

The meaning of existing ISO lines can therefore be adapted over time, to allow the device 1, or other devices produced to the same design, to operate in ways that may not have been considered at the time of its manufacture, through new firmware (e.g. a firmware update) provided to the first and/or second microcontrollers 6, 9.

Figure 6:
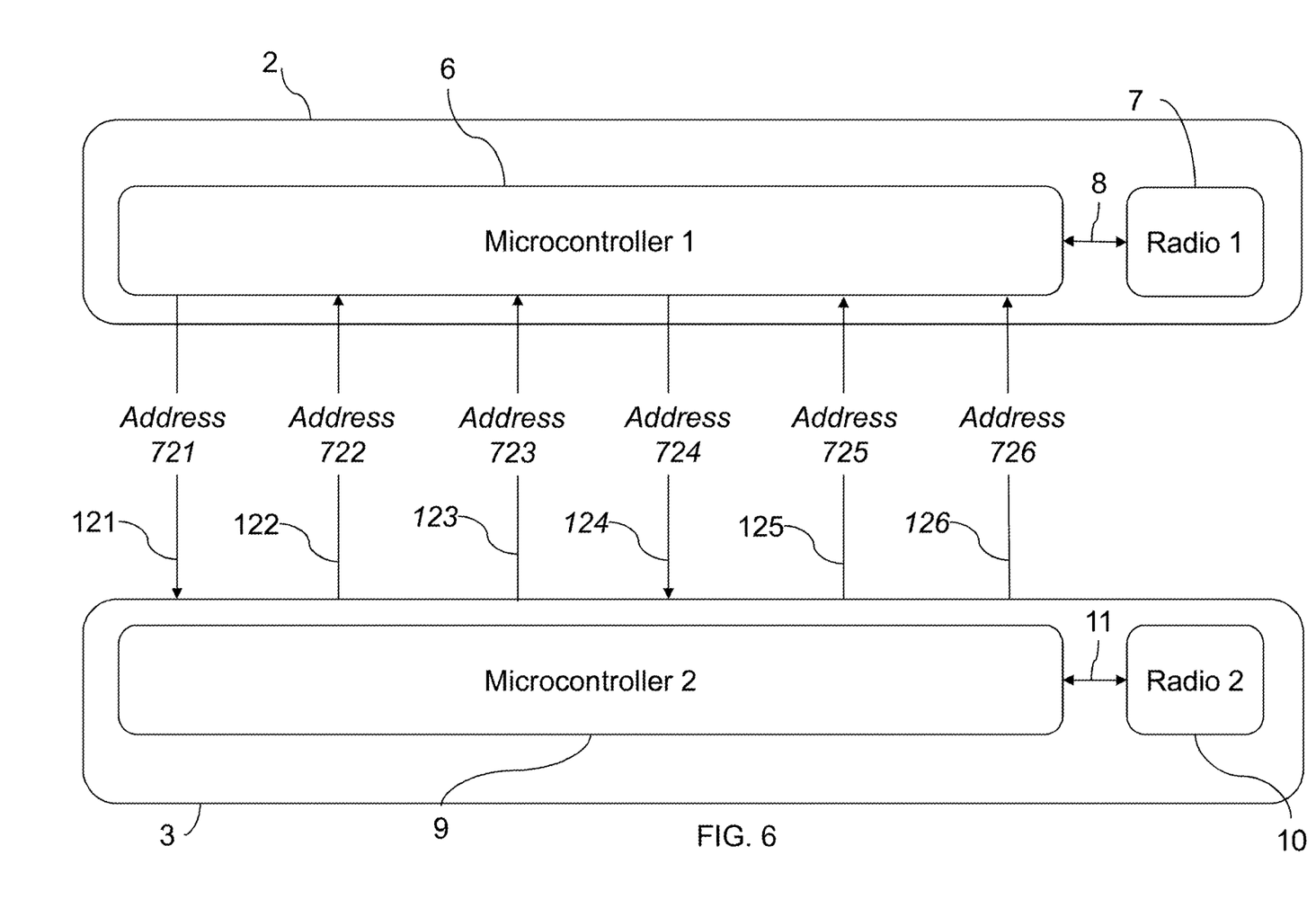
FIG. 6 is a schematic diagram showing an example use of the inter-subsystem communication link.

Updates to the firmware of the first and second microcontrollers 6, 9 can similarly be applied to embodiments in which interrupts sent over the ISO link 12 correspond to one or more predetermined addresses in the shared memory unit 5. An example of this is shown in FIG. 6, which shows the first and second radio subsystems 2, 3 of the device 1 at a first time $t_1$. As can be seen in FIG. 6, the first and second microcontrollers 6, 9 are again connected by six ISO lines 121-126. Signals received over each of the ISO lines 121-126 instruct the receiving microcontroller 6, 9 to read from different respective predetermined addresses in the shared memory unit 5. The predetermined address (or set of addresses) associated with of each of the ISO lines 121-126 are shown as text labels in FIG. 6. The actual signal that is sent, however, does not encode the address, but may be just a simple signal (e.g. a pulse).

In one example usage scenario, at a first time $t_1$, only three sets of addresses 721-723, i.e. those associated with ISO lines 121-123, store data having a defined meaning to the firmware that reads it, while addresses associated with the remaining ISO lines 124-126 store null data. In a manner equivalent to that described in relation to FIGS. 5 and 6, a firmware update may be applied to the device 1 at a time $t_2$ to allow the device to handle priority transmission requests. In the embodiment shown in FIG. 6, data is written to the previously unused addresses 724-726 such that, following the update, they direct the firmware of the first and second microcontrollers 6, 9 that receives the signal to execute an indicated routine, thereby allowing the first and second microcontrollers 6, 9 to perform operations related to priority transmission requests. The data stored in the shared memory 5 may be a value that the firmware uses to determine what action to perform (e.g. by inputting it as a parameter to a switch statement), or it may comprise software instructions that can be executed by the processor 6a, 6b that receives the IRQ signal.

In the example shown in FIG. 6, the predetermined address 724 associated with the fourth ISO line 124 is updated (e.g. by the firmware on the first or second microcontroller during an firmware update or other initialisation process) to contain instructions for requesting priority transmission, while addresses 725 and 726 are updated to contain commands to allow or deny such transmissions respectively. As signals sent over the ISO lines 121-126 cause the receiving microcontroller 6, 9 to check the corresponding addresses 721-726, commands related to priority transmissions can be communicated. In this way, different determinations may be made by the second microcontroller 9 about when to allow transmission by the first radio 7 depending on whether the request is a priority request (i.e. received over the fourth ISO line 124) or a standard request (i.e. received over the first ISO line 121).

The meaning of signals sent over a set of one or more inter-subsystem communication lines can therefore be adapted over time, to allow devices as disclosed herein to operate in different ways, e.g. in way that may not have been considered at the time the hardware was designed or manufactured.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A device comprising:
    a first radio system comprising: a first processor, a first program memory coupled to the first processor, and a first radio coupled to the first processor;
    a second radio system comprising: a second processor, a second program memory coupled to the second processor, and a second radio coupled to the second processor;
    inter-processor communication circuitry, coupled to the first and second processors, for providing an inter-processor communication channel between the first processor and the second processor; and
    first software stored in the first program memory for execution by the first processor;
    wherein the device is an integrated-circuit device;
    wherein the first software comprises instructions for causing the first processor, in response to receiving a signal from the first radio, to send an electrical signal over the inter-processor communication channel to the second processor for causing second software stored in the second program memory to cause the second processor to send a command to the second radio; and
    wherein the inter-processor-communication channel comprises a plurality of signal lines between the first and second processors, and wherein the first software comprises instructions for causing the first processor to send electrical signals over different respective signal lines in response to receiving signals of different respective types from the first radio.

2. The device of claim 1, further comprising the second software stored in the second program memory, the second software comprising instructions for causing the second processor to send the command to the second radio in response to the second processor receiving the electrical signal over the inter-processor communication channel.

3. The device of claim 1, wherein the first software comprises instructions for controlling transmission by the second radio in dependence on a transmission state of the first radio.

4. The device of claim 3, wherein the first software comprises instructions for causing the first processor to send the electrical signal over the inter-processor communication channel to the second processor, representative of the transmission state of the first radio, for causing second software, stored in the second program memory, to cause the second processor to send the command to the second radio to prevent a transmission by the second radio when the first radio is transmitting.

5. The device of claim 1, wherein the first processor, the second processor, and the inter-processor communication circuitry are in a common clock domain.

6. The device of claim 5, wherein at least one of the first and second radios is in a further respective clock domain, different from said common clock domain.

7. The device of claim 5, wherein the first and second radios are also in said common clock domain.

8. The device of claim 1, wherein the electrical signal sent to the second processor over the inter-processor communication channel is an interrupt request signal for interrupting the second processor.

9. The device of claim 1, wherein the inter-processor communication circuitry comprises an inter-processor-communication peripheral connected to the second processor, wherein the electrical signal sent by the first processor over the inter-processor-communication channel is received by the inter-processor-communication peripheral, and wherein the inter-processor-communication peripheral sends a further electrical signal to the second processor in response to receiving the electrical signal.

10. The device of claim 1, further comprising a shared memory and a system bus, wherein the first processor and the second processer are coupled to the shared memory over the system bus, and wherein the inter-processor-communication channel is separate from the system bus.

11. The device of claim 1, comprising the second software stored in the second program memory, wherein the second software comprises instructions for causing the second processor, in response to receiving a signal from the second radio, to send a second electrical signal over the inter-processor-communication channel to the first processor, and wherein the first software comprises instructions for causing the first processor, in response to receiving the second electrical signal over the inter-processor-communication channel, to send a command to the first radio.

12. The device of claim 1, wherein the first software comprises instructions for causing the first processor, in response receiving to an electrical signal over the inter-processor-communication channel from the second processor, to send a command to the first radio.

13. The device of claim 12, wherein the first software comprises instructions for causing the first processor to read data from, or to execute further software stored in, a shared memory of the device, accessible by both the first and second processors, wherein reading said data or executing said further software causes the first processor to send said command to the first radio.

14. The device of claim 1, wherein:
the inter-processor-communication channel comprises a first signal line and a second signal line;
the first software comprises instructions for causing the first processor, in response to receiving a signal of a first type from the first radio, to send an electrical signal over the first signal line to the second processor for causing second software stored in the second program memory to cause the second processor to send a command of a first type to the second radio; and
the first software comprises instructions for causing the first processor, in response to receiving a signal of a second type from the first radio, to send an electrical signal over the second signal line to the second processor for causing second software stored in the second program memory to cause the second processor to send a command of a second type to the second radio.

15. The device of claim 14, wherein each of the signals of first and second types is selected from the group consisting of: a signal to request permission to transmit and receive; a signal to request permission to transmit; and a signal to request permission to receive; a signal to allow transmission and reception by the second radio; a signal to allow transmission by the second radio; a signal to allow reception by the second radio; a signal to deny transmission and reception by the second radio; a signal to deny transmission by the second radio; and a signal to deny reception by the second radio.

16. The device of claim 1, wherein, for one or both of the first and second processors, the actions taken by the respective processor in response to receiving a signal over the inter-processor-communication channel is determined in accordance with a software or hardware setting of the device.

17. The device of claim 1, wherein the first software comprises instructions for causing the first radio system to operate in a first state at a first time, and to operate in a second state at second time, wherein, when in the first state, the first software causes the first processor, in response to receiving a signal of a first type from the first radio, to send an electrical signal over a signal line of the inter-processor communication channel to the second processor for causing second software stored in the second program memory to cause the second processor to send a command to the second radio, and, when in the second state, the first software causes the first processor, in response to receiving a signal of a second type, different from the first type, from the first radio, to send an electrical signal over said signal line of the inter-processor communication channel to the second processor.

18. The device of claim 1, comprising one or more further radio systems, coupled to the inter-processor communication circuitry, wherein each further radio system comprises a respective processor, a respective program memory coupled to the processor, and a respective radio coupled to the processor.

19. A method of updating an integrated-circuit device, the device comprising:
a first radio system comprising: a first processor, a first program memory coupled to the first processor, and a first radio coupled to the first processor;
a second radio system comprising: a second processor, a second program memory coupled to the second processor, and a second radio coupled to the second processor;
inter-processor communication circuitry, coupled to the first and second processors, for providing an inter-processor communication channel between the first processor and the second processor; and
first software stored in the first program memory for execution by the first processor;
wherein the first software comprises instructions for causing the first processor, in response to receiving a signal of a first type from the first radio, to send an electrical signal over a signal line of the inter-processor communication channel to the second processor for causing second software stored in the second program memory to cause the second processor to send a command to the second radio;
the method comprising:
the device receiving updated first software; and
storing the updated first software in the first program memory,
wherein the updated first software comprises instructions for causing the first processor, in response to receiving a signal of a second type, different from the first type, from the first radio, to send an electrical signal over said signal line of the inter-processor communication channel to the second processor.

20. A device comprising:
a first radio system comprising: a first processor, a first program memory coupled to the first processor, and a first radio coupled to the first processor;

a second radio system comprising: a second processor, a second program memory coupled to the second processor, and a second radio coupled to the second processor;

inter-processor communication circuitry, coupled to the first and second processors, for providing an inter-processor communication channel between the first processor and the second processor; and first software stored in the first program memory for execution by the first processor;

wherein the device is an integrated-circuit device;

wherein the first software comprises instructions for causing the first processor, in response to receiving a signal from the first radio, to send an electrical signal over the inter-processor communication channel to the second processor for causing second software stored in the second program memory to cause the second processor to send a command to the second radio; and wherein the device further comprises a shared memory and a system bus, wherein the first processor and the second processer are coupled to the shared memory over the system bus, and wherein the inter-processor-communication channel is separate from the system bus.

\* \* \* \* \*